United States Patent [19]

Matz et al.

[11] Patent Number: 4,973,133
[45] Date of Patent: Nov. 27, 1990

[54] ARRANGEMENT FOR COUPLING AN OPTICAL FIBER TO A COUPLING WINDOW OF A PLANARLY INTEGRATED OPTICAL COMPONENT AND THE METHOD OF MANUFACTURING THE ARRANGEMENT

[75] Inventors: Richard Matz, Feldkirchen/Westerham; Gerhard Winzer, Putzbrunn, both of Fed. Rep. of Germany

[73] Assignee: Siemens Aktiengesellschaft, Berlin and Munich, Fed. Rep. of Germany

[21] Appl. No.: 406,599

[22] Filed: Sep. 13, 1989

[30] Foreign Application Priority Data

Sep. 29, 1988 [DE] Fed. Rep. of Germany ....... 3833147

[51] Int. Cl.$^5$ .............................................. G02B 6/30
[52] U.S. Cl. .................... 350/320; 156/647; 156/656; 204/192.35; 350/96.17
[58] Field of Search ............... 350/96.11, 96.12, 96.15, 350/96.16, 96.17, 96.18, 96.20, 96.22, 320; 250/227; 204/192.32, 192.34, 192.35, 192.36, 192.37; 156/647, 648, 649, 655, 656

[56] References Cited

U.S. PATENT DOCUMENTS

| 4,301,462 | 11/1981 | Lowry | 350/96.17 X |
| 4,759,595 | 7/1988 | Boord et al. | 350/96.17 X |
| 4,765,702 | 8/1988 | Dohan et al. | 350/96.12 |
| 4,802,727 | 2/1989 | Stanley | 350/96.20 |
| 4,826,272 | 5/1989 | Pimpinella et al. | 350/96.20 |
| 4,883,743 | 11/1989 | Booth et al. | 350/96.17 X |

FOREIGN PATENT DOCUMENTS

| 62-17711 | 1/1987 | Japan | 350/96.17 |
| 63-223716 | 9/1988 | Japan | 350/96.17 |

OTHER PUBLICATIONS

Keil et al., "Coupling Between Semiconductor Laser Diodes and Single-Mode Optical Fibers" *Siemens Forschungs-und Entwicklungsberich* vol. 13, No. 6, 1984, pp. 284–288.

Karstensen et al., "Linsenoptik für Lasermodule mit Monomode-Anschlussfaser" *Siemens Forschungs-und Entwicklungsberichte,* vol. 16, No. 4, 1987, pp. 141–146.

Prucnal et al., "Integrated Fiber-Optic Coupler for Very Large Scale Integration Interconnects" *Optics Letters,* vol. 11, No. 2, Feb. 1986, pp. 109–111.

Bowers et al., "Etching of Deep Grooves for the Precise Positioning of Cleaves in Semiconductor Lasers" *Applied Physic Letter,* vol. 46, No. 5, Mar. 1, 1985, pp. 453–455.

*Primary Examiner*—John D. Lee
*Attorney, Agent, or Firm*—Hill, Van Santen, Steadman & Simpson

[57] ABSTRACT

A coupling arrangement for coupling an optical fiber to a planar integrated optical component characterized by a V-shaped groove being formed in a surface of the substrate, at least one end of the groove being closed by a vertical substrate wall containing an optical window formed by an end of an integrated optical component in said substrate, and an end of an optical fiber being secured in said groove with an end face being positioned adjacent said optical window. The arrangement is preferably made by etching oblique channels into a substrate containing the optical component to form a bridge extending parallel with the optical component, the bridge is then removed to expose an optical window in a substantially vertically extending wall, and then the optical fiber is positioned and secured in the groove with the end face of the fiber being positioned adjacent the optical window.

1 Claim, 1 Drawing Sheet

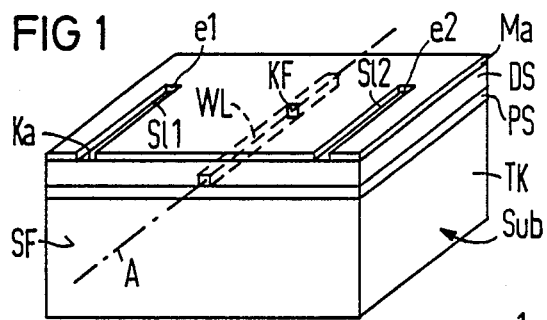
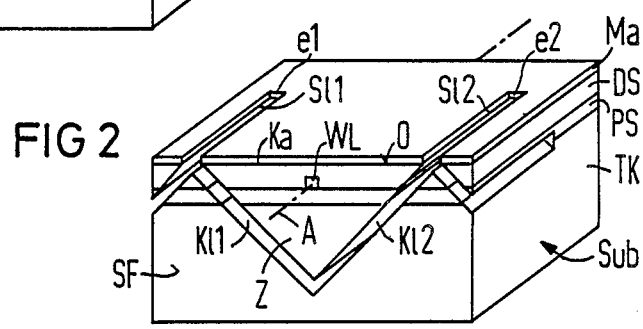
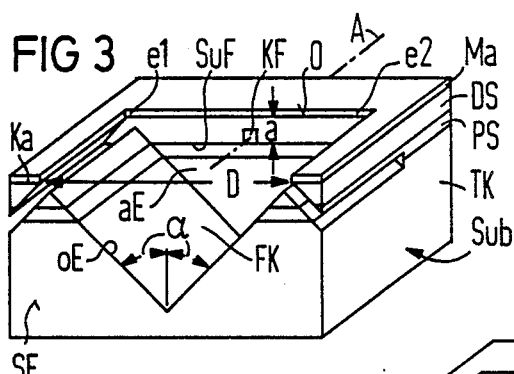
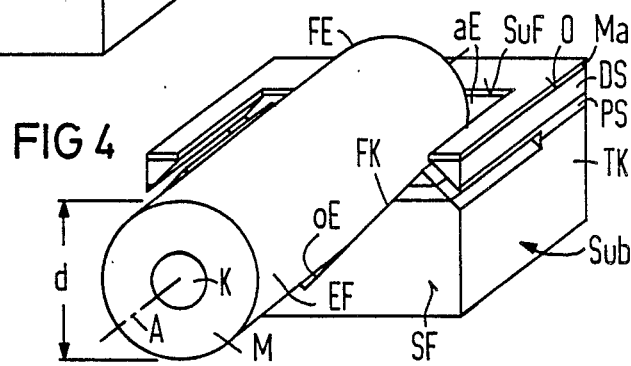

ARRANGEMENT FOR COUPLING AN OPTICAL FIBER TO A COUPLING WINDOW OF A PLANARLY INTEGRATED OPTICAL COMPONENT AND THE METHOD OF MANUFACTURING THE ARRANGEMENT

BACKGROUND OF THE INVENTION

The present invention is directed to an arrangement for coupling an optical fiber to a coupling window of a planar integrated optical component for incoupling and outcoupling of optical waves into and out of the planar integrated optical component, which is disposed on a substrate, particularly a planar integrated optical waveguide. The invention is also directed to the method of making the arrangement.

Properties of fiber-optical signal transmission links are co-defined by the quality of the optical coupling of the glass fibers to the transmission and reception modules. Since the light wave guided in the fiber usually comprises a lateral mode expanse in the $\mu$m region, an appropriately exact adjustment of the elements relative to one another is required. Given single-mode, integrated waveguides on a III-IV semiconductors, the allowable lateral adjustment tolerances can also shrink to far below the 1 $\mu$m because of the shortness of the light wavelength.

Previous arrangements of low-loss coupling are usually matched to the demand of a hybridly constructed module. The fiber and optical component to be coupled are each mounted on a respective sub-carrier, namely together with a coupling optics respectively required for mode matching. It can be composed of a fiber taper having a contact lens, such as disclosed in an article by R. Keil et al Entitled "Coupling Between Semiconductor Laser Diodes and Single-Mode Optical Fibers", *Siemens Forschungs -und Entwicklungsberichte*, Vol. 13, (1984), No. 6, pp. 284–288. The coupling optics can also be composed of spherical or, respectively, gradient lenses, as disclosed in an article by H. Karstensen et al Entitled: "Linsenoptik für Lasermodule mit Monomode-Anschlubfaser" *Siemens Forschungs - und Entwicklungsberichte*, Vol. 6, (1987), No. 4, pp. 141–146. The sub-units hereby defined are then firmly soldered relative to one another on the main carrier directly after adjustment. The possibility in this method of initially inspecting the sub-units separately and readjusting them during mounting can be advantageous, but must be paid for with space requirements for coupling locations and mounting outlays.

SUMMARY OF THE INVENTION

The object of the present invention is to provide a compact, easily mountable arrangement for coupling an optical fiber to a coupling window of a planar integrated component, particularly a planarly integrated waveguide that can be directly fashioned on the substrate on which the optical component is integrated.

A second object of the invention is to provide a method for manufacturing this arrangement.

To accomplish these goals, the coupling arrangement of the invention is directed to an arrangement for coupling an optical fiber to a coupling window for the incoupling and outcoupling of optical waves into and out of a planar integrated optical component on the substrate, particularly a planar integrated optical waveguide, said arrangement comprising the substrate having a groove in an outer surface with at least one end closed by a portion of the substrate, a coupling window of the optical component being arranged in this closed end, and an end section of a fiber being arranged in the groove and having a fiber end surface lying opposite the coupling window so that the optical waveguide can couple over directly between the fiber and the component through the fiber end surface and the coupling window.

The guide channel of the invention represents a carrier structure for the glass fiber that can be manufactured by monolithic integration and on the basis whereof the possibility is established of planarly coupling the glass fiber to the planarly integrated, optical component on the substrate, given the low space and adjustment requirements.

In the preferred embodiment, the groove has a V-shaped cross section.

To manufacture this arrangement, the method includes providing a substrate having an integrated light waveguide to form the optical component, forming two slot-shaped channels that extend in terms of length at least into the height where the coupling window is to be formed, said slots proceeding obliquely from the surface of the substrate towards one another into the depth of the substrate until they intersect one another or cross one another beneath the waveguide. The forming of the slot is preferably by providing a mask having two parallel extending slots at the desired distance apart and etching obliquely through these two slots in the mask. The etching or forming of the obliquely-shaped channels produces a bridge which is separated from the substrate by the oblique channels. This bridge is then removed to form a V-shaped groove. Subsequently, an end section of a fiber is secured in the groove having the V-shaped cross section with the end face of the fiber being positioned adjacent the coupling window.

It should be pointed out that an article by Prucnal et al Entitled "Integrated Fiber-Optic Coupler for Very Large Scale Integration Interconnects", *Optics Letters*, Vol. 11, No. 2, Feb. 1986, pp. 109–111, disclose an arrangement for coupling an optical fiber to a coupling window for coupling an optical wave into a photodiode integrated on a substrate in a very large scale integrated circuit (VLSIC). The fiber is arranged in a blind hole, which is fashioned in the substrate, and this blind hole is aligned perpendicularly to the substrate surface. The coupling window of the photodiode is situated on the base or floor of this blind hole. As a result of the vertical connection of the fiber to the substrate surface, this solution allows a high packing density at any arbitrary location of the substrate surface; however, due to its vertical arrangement, it is not suitable for an outcoupling of a fiber of a planar structure of integrated optics, for example a planarly integrated optical waveguide.

Other advantages and features of the invention will be readily apparent from the following description of the preferred embodiments, the drawings and claims.

BRIEF DESCRIPTION OF THE DRAWINGS

FIG. 1 is a perspective view of a substrate having a planarly integrated waveguide and an etching mask applied to the surface adjacent the layer containing the waveguide;

FIG. 2 is a perspective view of the substrate of FIG. 1 after the etching step to form obliquely extending slot-shaped channels to create a cantilevered tongue that contains part of the waveguide and extends from the lateral edge of the substrate at least up to the position of the coupling window;

FIG. 3 is a perspective viw of the substrate after removal of the cantilevered tongue up to the planned coupling window; and FIG. 4 is a perspective view after fastening of an end section of a fiber in the groove, with the end face being positioned adjacent the coupling window.

DESCRIPTION OF THE PREFERRED EMBODIMENTS

The principles of the present invention are particularly useful in the arrangement illustrated in FIG. 4, which is made by the steps illustrated by FIGS. 1, 2, 3 and 4.

In the initial stage of the method for manufacturing the exemplary arrangement, and substrate Sub, which is provided with a planarly intergrated optical waveguides WL, is composed, for example, of a carrier member TK of InP on which a buffer layer PS of InP is epitaxially applied. A waveguide WL, which is composed of a strip of quaternary material, for example InGaAsP material, is epitaxially applied on the buffer layer PS and is then covered by a cover layer DS of InP, which is applied on the buffer layer to surround the waveguide WL. As illustrated, the waveguide WL extends to a lateral or end surface SF of the substrate Sub, which forms a lateral edge Ka with a top surface O of the substrate and the waveguide extends into the interior of the substrate Sub along a longitudinal axis A. For example, the waveguide can be a waveguiding, light-intensifying layer of a laser diode.

An etching mask Ma is then applied to the cover layer DS and, as illustrated in FIG. 1, has two oblong slots S11 and S12 in which the surface O of the substrate is exposed. The slots S11 and S12 are arranged on both sides of the planar waveguide LW and extend parallel to the longitudinal axis of this waveguide and extend at least from the lateral edge Ka of the substrate up into the level of the coupling window KF. The height or depth of the coupling surface KF of the window corresponds to the distance of the coupling window KF from the lateral edge KA of the substrate, as measured in the direction of the axis A.

The slots S11 and S12 can be manufactured in a known photolithographic process. After providing the mask with the slots S11 and S12, channels or slots K11 and K12, as illustrated in FIG. 2, are formed to extend obliquely into the substrate until they intersect one another in the depth of the substrate Sub under the waveguide WL. These slot-shaped channels K11 and K12 lie in two crossing planes, and the section line (not shown and proceeds in the substrate) proceeds under the waveguide WL and parallel to the axis A of the waveguide WL.

The two slots K11 and K12 form a cantilevered tongue or bridge Z, which has a triangular cross section and is situated between the two slots. This cantilevered tongue Z extends from the lateral edge Ka of the substrate Sub in the direction of the axis A of the waveguide WL up to the ends el and el of the slots S11 and S12, respectively, of the mask MA.

The channels K11 and K12 are preferably formed by a laser-induced wet-etching process, which is known in the art and is disclosed, for example, in an article by Bowers et al Entitled "Etching of Deep Grooves for the Precise Positioning of Cleaves and Semiconductor Laser", *Applied Physics Letters*, Vol. 46, No. 5, Mar. 1, 1985, pp. 453–455. The laser-induced, wet-etching is first applied at a direction that extends approximately 45° to the surface so that the channel, such as K11, extends obliquely approximately 45° to a vertical axis. After forming this one channel, the second channel K12 is formed by oblique etching through an angle 45°, which is offset by 90° from the first mentioned angle.

The tongue or bridge Z is then removed up to the position of the coupling window KF, as illustrated in FIG. 3. This can be occurred by splitting the cantilevered tongue off in an ultrasonic bath.

After the cantilevered tongue Z has been removed, a groove FK proceeds in the direction of the axis A of the waveguide WL arises at the surface O of the substrate Sub and has a triangular cross section that exhibits an opened end oE at the lateral edge Ka of the substrate Sub and exhibits an end aE terminated by a triangular substrate surface SuF that resides essentially vertically relative to the longitudinal axis A. The coupling window KF in the form of an exposed end of the waveguide WL is set back relative to the lateral surface SW of the substrate and is arranged in this triangular substrate surface SuF. The position of the coupling window KF only has to be approximately defined by the ends e1 and e2, the slots S11 and S12 of the etching mask MA, and is uncritical. In practice, the coupling window KF will lie somewhat closer to the lateral edge Ka of the substrate Sub than these ends e1 and e2.

Given a suitable dimensioning, an end section EF of a glass fiber, for example a core-cladded glass fiber comprising a core K and a cladding M, can be secured within the groove FK with an end surface FE of this end section EF, more precisely the core of this end section, lying opposite the coupling window KF of the waveguide WL. Thus, the end section EF and the waveguide WL will be aligned, as illustrated in FIG. 4.

For the best mode matching, the end surface FE of the end section EF can be fashioned as a taper surface with a connected lens.

Given sidewall slopes $\alpha=45°$ for the groove FK, as illustrated in FIG. 3, and given an outer cladding diameter d of the fiber, the width D of the groove at the surface of the substrate Sub must be equal to $D=2a+d\sqrt{2}$. With such a dimension, the axis of the fiber core K, which is assumed to be concentric relative to the longitudinal axis A, will strike the integrated waveguide WL at the distance a under the surface O of the substrate Sub.

Given a plurality of fibers to be coupled, the low space requirement allows a minimum lateral spacing of the individual coupling windows or locations from one another. The method is suitable for applications wherein the tolerance can be obtained photolithographically and in etching technologies are adequate in order to position the fiber with adequate precision relative to the coupling window or, respectively, relative to the coupling location with only little adjustments or even no adjustments within the groove having the V-shaped cross section.

In one exemplary embodiment, a tongue Z that was about 50 μm wide was produced by laser-induced, wet-etching. The etching mask in this example was a vapor-deposited titanium layer.

The grooves for fastening the fiber end section need not be opened at one end, as illustrated in FIG. 3. They can be produced at any arbitrary location of the surface of the substrate and can be terminated at both ends by substrate surfaces. The coupling of the fiber brought parallel to the surface of the substrate is then possible, in this case, when the length of the grooves is sufficient for conducting the fiber out of the surface of the substrate by a curvature at a terminated end of the groove.

Although various minor modifications may be suggested by those versed in the art, it should be understood that we wish to embody within the scope of the patent granted hereon all such modifications as reasonably and properly come within the scope of our contribution to the art.

We claim:

1. A method for manufacturing an arrangement comprising a substrate having a V-shaped groove which is terminated at least at one end by a closed substrate surface containing a coupling window of an optical component, said groove containing an end section of an optical fiber with the end surface of the optical fiber being positioned opposite the coupling window, said method comprising the steps of providing a substrate having an optical waveguide disposed beneath a surface of the substrate, providing an etching mask on said surface having two slots extending parallel to the waveguide on opposite sides of said waveguide, said slots exposing a portion of said surface and terminating inward of one end of said substrate, obliquely etching the substrate through said slots to form two slot-shaped channels proceeding obliquely from the substrate surface towards one another to a depth of the substrate until they intersect one another under the waveguide to form a bridge separated from the rest of the substrate by said channels, removing said bridge up to the approximate length of the position where the coupling window is to be provided to form a V-shaped groove being terminated at least at one end by a substantially vertical substrate surface containing said window, and then securing an end section of a fiber in said V-shaped profile groove with an end surface of said fiber being positioned adjacent said window.

* * * * *